March 1, 1949.    B. D. STUVEL    2,463,066

EMERGENCY HANDLE

Filed Oct. 25, 1945

INVENTOR.
BERNARD D. STUVEL,

BY

Hood & Hahn
ATTORNEYS.

Patented Mar. 1, 1949

2,463,066

UNITED STATES PATENT OFFICE 2,463,066

EMERGENCY HANDLE

Bernard D. Stuvel, Indianapolis, Ind.

Application October 25, 1945, Serial No. 624,383

2 Claims. (Cl. 287—53)

The object of my invention is to provide a handle which may be applied to any one of the several forms of valve stems of faucets, radiators, etc., commonly found in use.

The accompanying drawings illustrate my invention.

Figure 1:
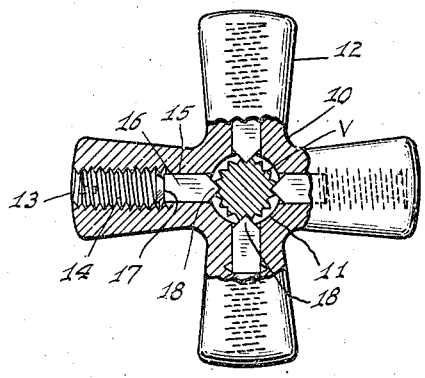
Fig. 1 is a plan, in partial horizontal section of an embodiment of my invention, in place on a valve stem of the knurled end type.

In the drawings the hub or central portion 10 of the handle is axially bored at 11 to receive the exposed end of any commonly used valve stem V, and has radiating arms 12, 12 each of which is radially bored and threaded at 13 to receive an abutment screw 14. At the inner end of each threaded bore 13, and communicating with bore 11, is a passage 15 of polygonal (preferably square) cross section in each of which is slidably mounted a dog 16, one end of which is flat, as at 17, and the other end of which is tapered to a blunt knife edge 18.

Figure 2:
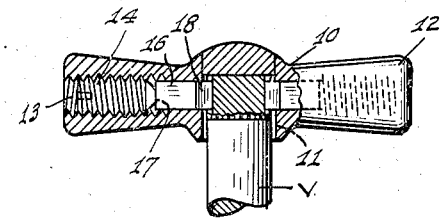
Fig. 2 is a side elevation, in partial vertical section, of the structure shown in Fig. 1.

By properly positioning the dogs 16 in their channels, they may be so arranged, when abutted by screws 14, as to firmly engage any type of valve stem. In Figs. 1 and 2, the dogs are so arranged that their knife edges are received in the flutes of a knurled end valve stem. In this same position, the dogs may be caused to bite into the periphery of a cylindrical valve stem.

Figure 3:
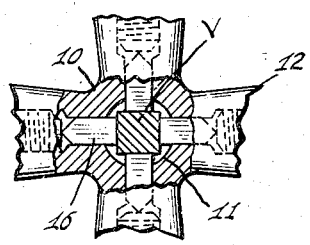
Fig. 3 is a fragmentary section showing application to a valve stem of the squared end type.
Figure 4:
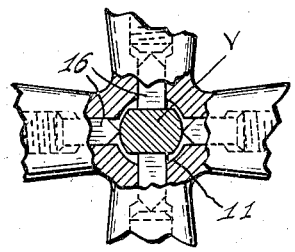
Fig. 4 is a fragmentary section showing application to a valve stem of another common type.

In Fig. 3, the squared ends of the dogs are arranged to engage the flat perimetral surfaces of the squared end of a valve stem. In Fig. 4, the valve stem has two opposite flat surfaces separated by two opposite part-cylindrical surfaces so that two of the dogs are arranged with their squared ends engaging flat faces of the stem and two with their blunt knife edges biting into the part-cylindrical portions of the stem.

Figure 5:
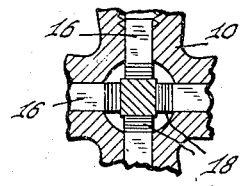
Fig. 5 is a fragmentary section showing another arrangement of the stem-engaging dogs.

In Fig. 5, the dogs are arranged to engage the squared end of a stem by their knife edge ends arranged transversely of the stem axis.

It will be noted that the above-described handle may be readily and firmly applied to a handleless valve stem of any common form no matter how damaged.

I claim as my invention:

1. A handle for valve stems comprising a main body having an axial bore for the reception of a valve stem end, and having a plurality of bores radiating from said first-mentioned bore, an abutment screw threaded into the outer end of each of said radiating bores, the inner end of each radiating bore being square in cross section, and a plunger, square in cross section and slidably mounted in the inner end of each of said radiating bores and engageable by the adjacent abutment screw, each of said plungers at its inner end having a blunt knife-edge tip substantially longer than thick, whereby said plungers may slide in said bores in either of two positions of the plungers in their bores, one presenting the edge of the tip parallel with the axis of the stem bore and the other presenting the edge of the tip at right angles to the axis of the stem–receiving bore.

2. A handle for valve stems comprising a main body having an axial cavity therein to receive the exposed end of a valve stem, a plurality of bores radiating from said cavity and open at both ends, one bisector of the cross section of each bore lying in a plane including the axis of said cavity and another bisector of such cross section being normal to such plane, a dog for each of said bores, each dog being symmetrical in cross section, having one squared end and one end tapered to a rectilinear edge bisecting its cross section, each dog being alternatively longitudinally slidably receivable in that end portion of its bore adjacent said cavity with its rectilinear edge coincident with either of said bisectors, the other end portion of each bore being threaded, and a screw threadedly mounted in the threaded portion of each bore to engage the associated dog and urge the same toward the axis of said cavity.

BERNARD D. STUVEL.

REFERENCES CITED

The following references are of record in the file of this patent:

UNITED STATES PATENTS

| Number | Name | Date |
|---|---|---|
| 1,878,569 | Zolleis | Sept. 20, 1932 |
| 2,377,541 | Crampton | June 5, 1945 |